No. 755,534. PATENTED MAR. 22, 1904.
W. E. PENN.
HORSE COLLAR BLOCKING MACHINE.
APPLICATION FILED OCT. 12, 1903.
NO MODEL. 7 SHEETS—SHEET 1.

Fig. 1.

Witnesses.
C. H. Keeney
Anna F. Schmidtbauer

Inventor.
William E. Penn
By Benedict & Morsell
Attorneys.

No. 755,534. PATENTED MAR. 22, 1904.
W. E. PENN.
HORSE COLLAR BLOCKING MACHINE.
APPLICATION FILED OCT. 12, 1903.
NO MODEL. 7 SHEETS—SHEET 2.

Witnesses.
Inventor.
William E. Penn
By Benedict & Morsell
Attorney

THE NORRIS PETERS CO., PHOTO-LITHO., WASHINGTON, D. C.

No. 755,534. PATENTED MAR. 22, 1904.
W. E. PENN.
HORSE COLLAR BLOCKING MACHINE.
APPLICATION FILED OCT. 12, 1903.
NO MODEL. 7 SHEETS—SHEET 3.

Fig. 3.

Witnesses.
C. H. Keeney.
Anna F. Schmidtbauer.

Inventor.
William E. Penn
By Benedict & Morsell
Attorneys.

No. 755,534. PATENTED MAR. 22, 1904.
W. E. PENN.
HORSE COLLAR BLOCKING MACHINE.
APPLICATION FILED OCT. 12, 1903.
NO MODEL. 7 SHEETS—SHEET 4.

No. 755,534. PATENTED MAR. 22, 1904.
W. E. PENN.
HORSE COLLAR BLOCKING MACHINE.
APPLICATION FILED OCT. 12, 1903.
NO MODEL. 7 SHEETS—SHEET 5.

Witnesses.
C. H. Keeney,
Anna F. Schmidtbauer

Inventor.
William E. Penn
By Benedict & Morsell
Attorneys.

THE NORRIS PETERS CO., PHOTO-LITHO., WASHINGTON, D. C.

No. 755,534. PATENTED MAR. 22, 1904.
W. E. PENN.
HORSE COLLAR BLOCKING MACHINE.
APPLICATION FILED OCT. 12, 1903.
NO MODEL. 7 SHEETS—SHEET 7.

No. 755,534. Patented March 22, 1904.

UNITED STATES PATENT OFFICE.

WILLIAM E. PENN, OF LAKEMILLS, WISCONSIN, ASSIGNOR TO FRANK B. FARGO AND ENOCH J. FARGO, OF LAKEMILLS, WISCONSIN.

HORSE-COLLAR-BLOCKING MACHINE.

SPECIFICATION forming part of Letters Patent No. 755,534, dated March 22, 1904.

Application filed October 12, 1903. Serial No. 176,614. (No model.)

*To all whom it may concern:*

Be it known that I, WILLIAM E. PENN, residing at Lakemills, in the county of Jefferson and State of Wisconsin, have invented a new and useful Improvement in Horse-Collar-Blocking Machines, of which the following is a description, reference being had to the accompanying drawings, which are a part of this specification.

My present invention relates to improvements in horse-collar-blocking machines of a character that are adapted to be employed singly or in series in a factory where sufficient power can be supplied to operate a number of machines, the method of operating these machines and the time required for doing their work while in a non-active condition being such that one person can attend to several of these machines.

This invention is directed to improvements in details of the construction of machines of this general character, the improvements being chiefly in the hame-crease-forming members and the means for operating them, other improvements being also made of a minor character, which will be hereinafter pointed out.

The invention consists of the novel mechanism, its parts and combinations, as herein described and claimed, or the equivalents thereof.

In the drawings, Fig. 4 is a horizontal section of the machine on line 4 4 of Fig. 3 looking downwardly.

In the drawings, A represents a frame of such size, form, and strength as is suitable and proper for the mechanism supported thereon and the work to be done on the machine. A bed-piece 2 in oval form horizontally is provided with a medially-disposed vertically-elongated hub-bearing 3, through which a guide-rod 4 passes movably vertically. The guide-rod 4 has a bearing near its lower end also in the frame A. The bed-piece 2 is provided with ears 5, through which are received loosely guide-pins 6, that are fixed in the frame and project downwardly therefrom. Stop-pins 7 are advisably inserted transversely through the guide-pins 6 to limit the movement of the bed-piece 2 downwardly.

Figure 7:
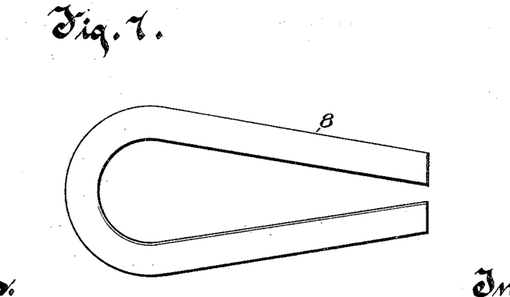
Fig. 7 is a plan of the lower roll-forming member.
Figures 11, 21, 24:
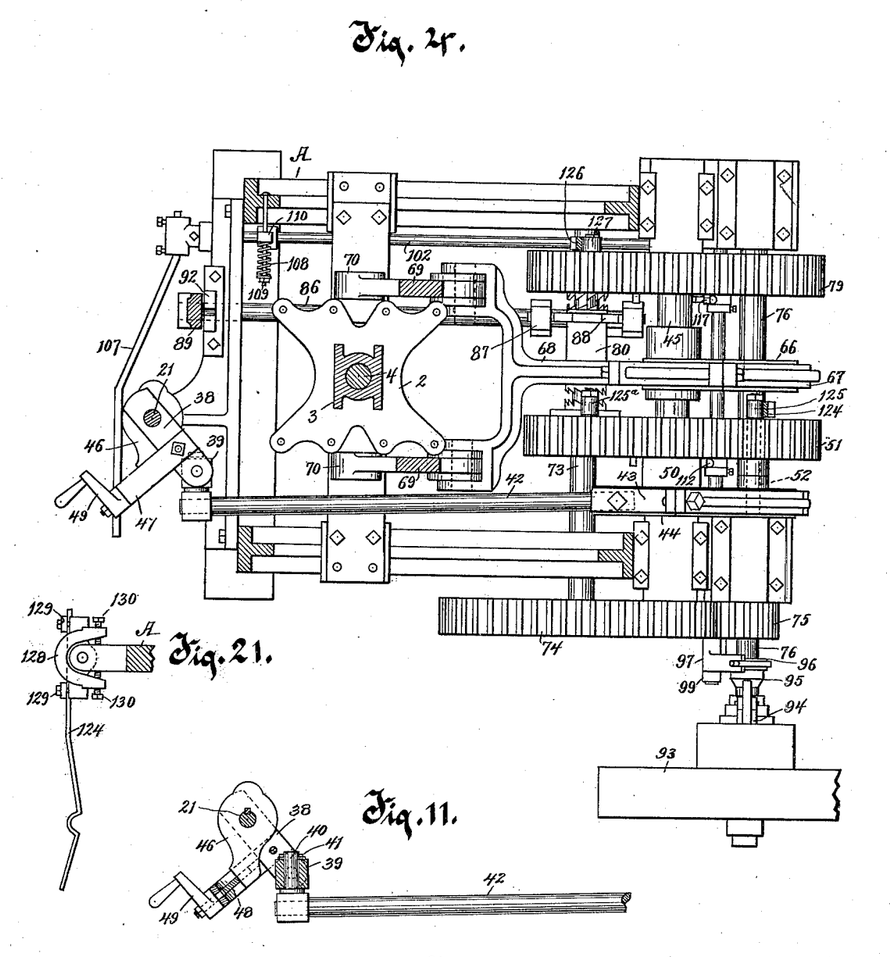
Fig. 21 is a detail of a stop-device found in the machine near the rear and at the right as shown in Fig. 3.
Figure 12:
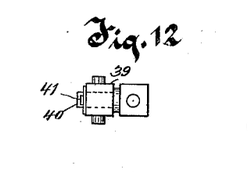

A roll-forming member 8 rests loosely on the top of the bed-piece 2. This roll-forming member 8 is of such form generally as the collar is that is to be shaped thereon, and in cross-section the top surface of this roll-forming member is curved to adapt it to properly shape the outer side of the roll B of the collar. The roll-forming member 8 is preferably open (see Fig. 7) at that end which corresponds with the withers of the collar to be formed thereon.

A hollow forming-block member 9 in proper oval shape horizontally is adapted to receive about it the horse-collar to be shaped thereon. This forming-block member is of considerable height vertically and at its upper end is continuous with the outwardly-curved and horizontally-projecting wale-forming member 10, and this forming-block member, with the wale-forming member thereon, is secured to and depends from the spider 11, which is mounted on the hub 12, that turns by a screw-thread on the guide-rod 4. The hub 12 is provided with an annular groove, in which the spider 11 fits loosely, providing for a slight amount of lateral and vertical play of the parts relatively. The lower wall of the groove in the spider may be formed conveniently by a collar 13, secured to the hub. The hub 12 is advisably provided with a hand-wheel 14. By this construction the forming-block member and the roll-forming member are made adjustable vertically on the guide-rod 4, and an index 15 on the guide-rod, in connection with an index-finger 16, conveniently in circumferential form, serves to indicate the extent of the adjustment of the forming-block member up or down on the guide-rod. The forming-block member and the wale-forming member are secured to the spider conveniently by bolts 17 17 through the spider and through projecting parts of the forming-block member and the wale-forming member. The wale-forming member 10 is so curved and projected outwardly as to adapt it to form a surface of the wale C of the collar.

Figure 1:
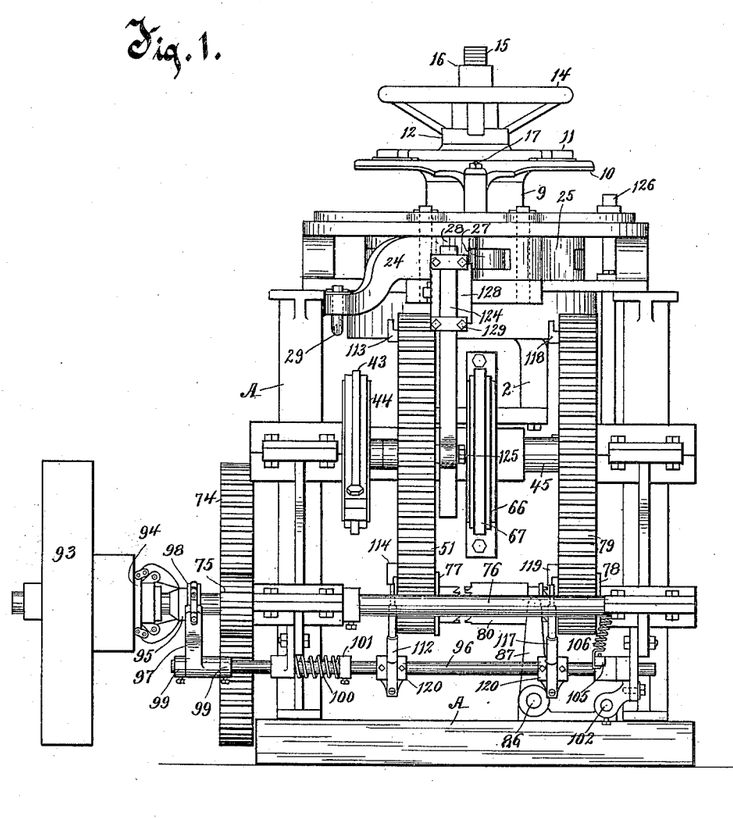
Figure 1 is an elevation of the rear end of the machine, which is at the right of the plan view of Fig. 2.
Figures 2, 8, 9, 10:
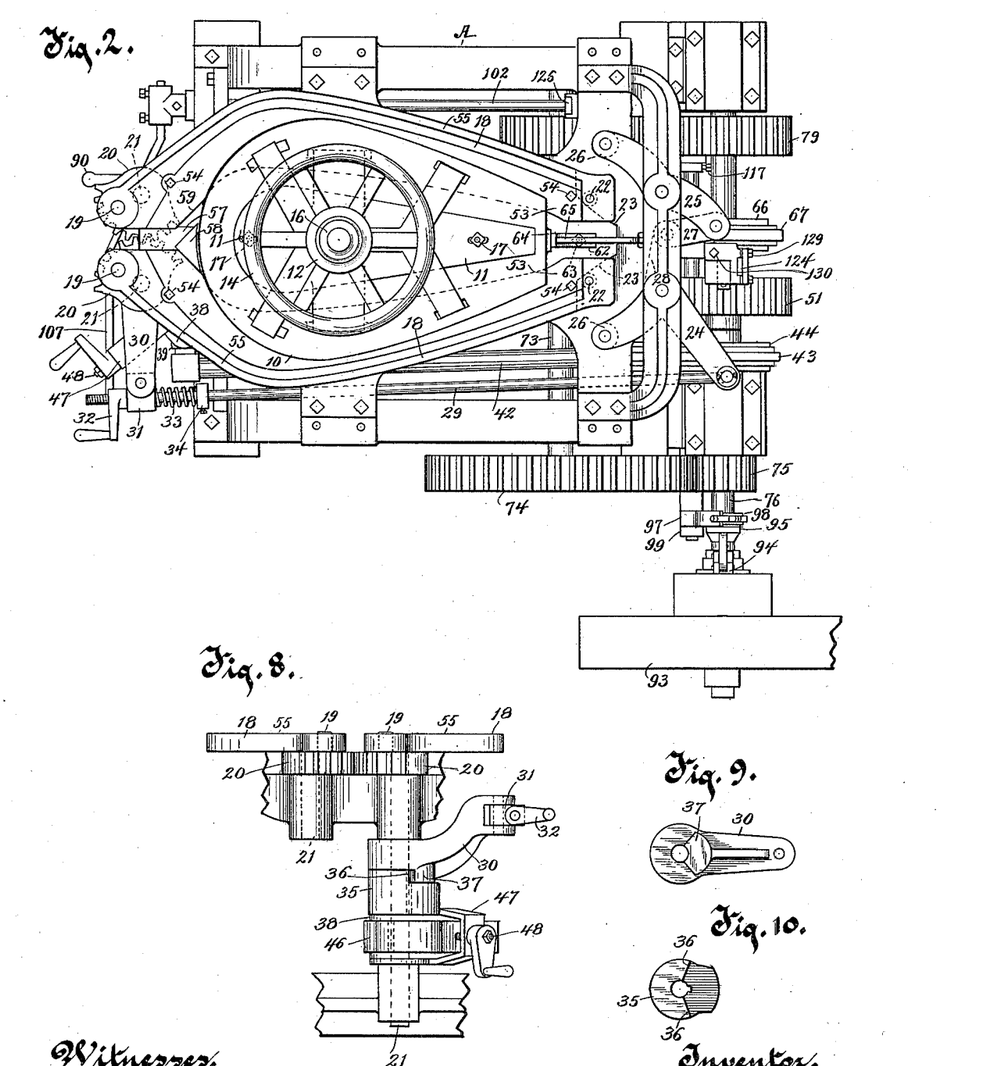
Fig. 2 is a top plan view of the improved machine.
Fig. 8 is a detail of devices employed in the mechanism for operating the hame-crease-forming members.
Figs. 9, 10, 11, and 12 show details of the construction in or relating to the devices shown in Fig. 8.
Figure 3:
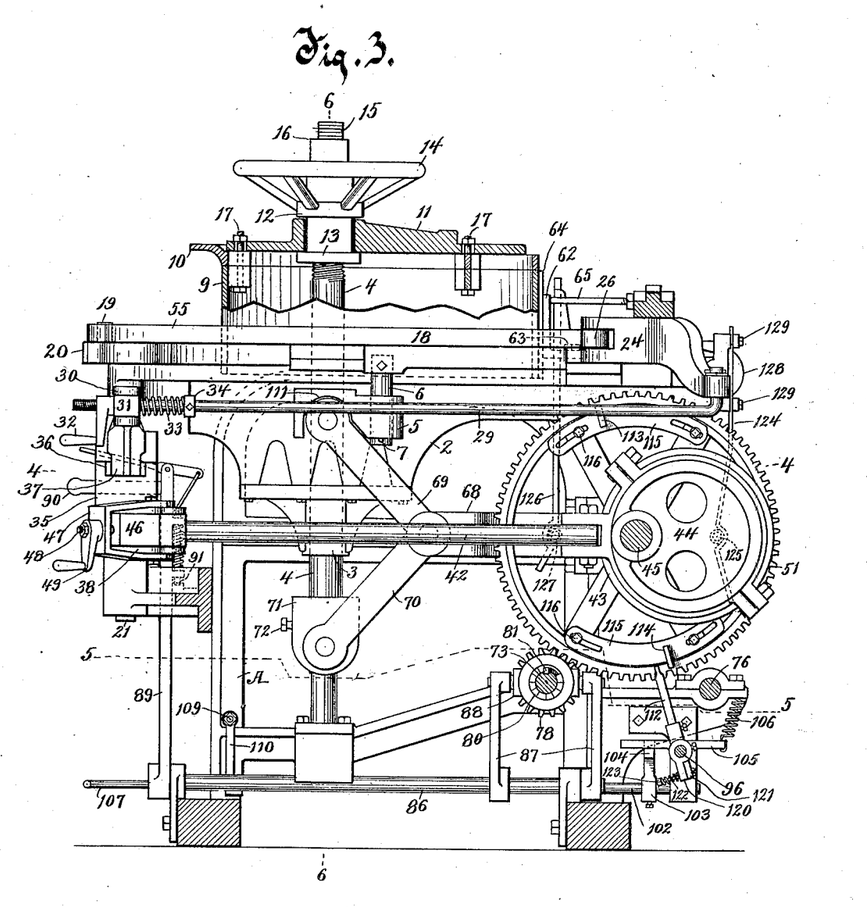
Fig. 3 is a side elevation of the machine, parts being shown in section.
Figure 5:
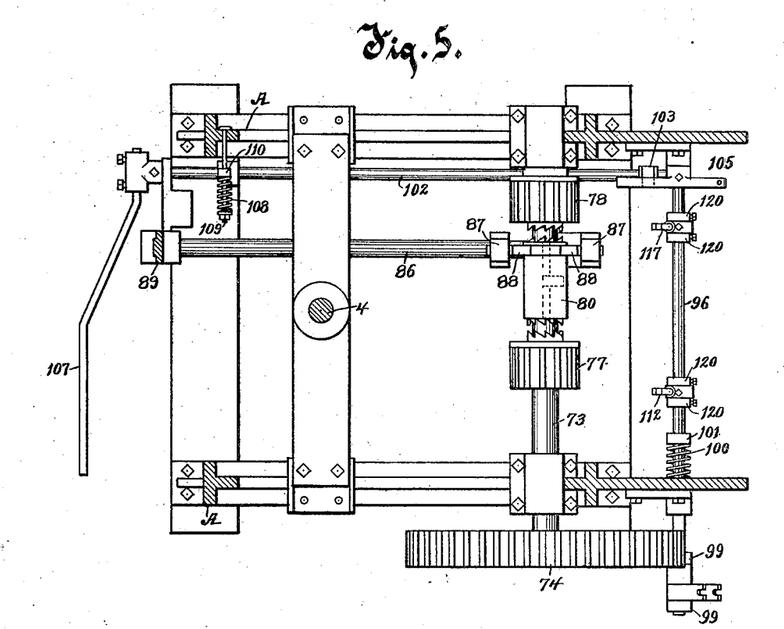
Fig. 5 is a horizontal section of the machine on line 5 5 of Fig. 3 looking downwardly.
Figure 6:
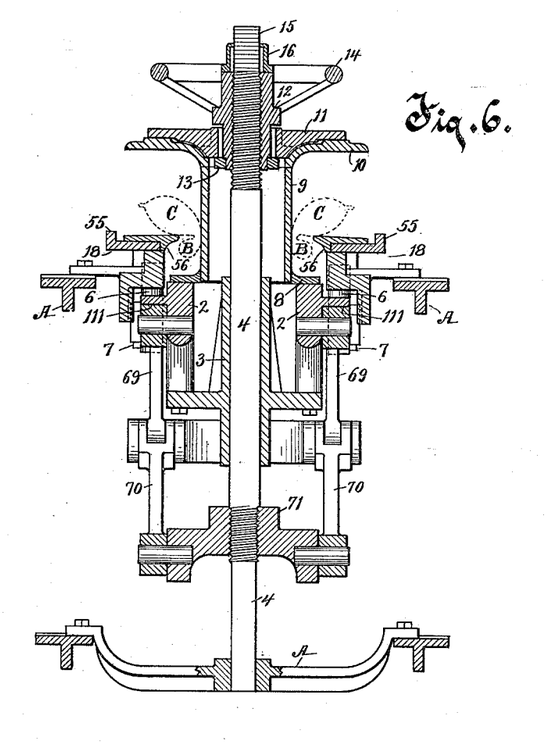
Fig. 6 is a vertical section on line 6 6 of Fig. 3, a horse-collar being shown in dotted lines in cross-section, the collar being in position about the block-forming member for being shaped by the machine.

For forming the hame crease or groove in the collar and shaping the parts of the collar adjacent thereto two complementary crease-forming members are provided. These crease-forming members consist of a pair of clamping-levers 18 18, conforming in a general way to the exterior elongated oval form of the horse-collar and being on their interior surfaces of such specific form as adapts them for shaping the hame-crease of the collar and parts adjacent thereto. These levers 18 at their front ends are pivoted by stud-pins 19 19 eccentrically on wheel-segments 20, which segments are provided with teeth that mesh with each other, the segments being pivoted concentrically with their teeth by arbors or shafts 21 on the frame. By rotating one of these shafts 21 both of the wheel-segments 20 are correspondingly rotated, moving the front ends of the levers 18 toward each other and rearwardly or away from each other and forwardly. At the rear ends the levers 18 are provided with stud-pins 22, projecting downwardly from the under surfaces thereof, and obliquely-disposed shoulders or guideways 23 (indicated by dotted lines) are provided on the frame, against which these pins bear when the levers are moved toward the front, thus compelling the rear ends of the levers to separate from each other to the extent and in the manner indicated by Fig, 2.

For bringing the rear ends of the levers 18 toward each other for clamping the levers about an interposed horse-collar and at the same time that the front ends of the levers are brought toward each other by the oscillation of the wheel-segments 20 a pair of levers 24 25 are provided, each of which is pivoted medially on the frame and each of which has a forwardly-projecting lever-arm advisably provided with an antifriction bearing-wheel 26, adapted when the arms are swung inwardly to contact with the outer side edges of the levers 18 and force the rear ends of the crease-forming levers toward each other. By mechanism hereinafter described this occurs synchronously with the bringing together of the front ends of the levers and moving them rearwardly. The rearwardly-extending arm of lever 25 is connected by a link 27 to a radial arm 28 of the triple bell-crank lever 24, so that when the lever 24 is oscillated the lever 25 will be correspondingly swung around. For operating these levers 24 25 synchronously with the oscillation or rotation of the wheel-segments 20 a rod 29, pivoted to one arm of the bell-crank lever 24, is connected to a crank-arm 30, loose on shaft 21, of one of the wheel-segments 20. To provide for adjusting the relations between the front and the rear mechanisms for clamping the levers 18, the rod 29 passes movably through a block 31, pivoted in the crank-arm 30, and the rod is provided with a handled nut 32, turning by screw-thread on the rod against the block 31, so that the length of the connection between levers 24 and 30 can be adjusted and their relations regulated. A spring 33, coiled about the rod 29 at the rear of the block 31 and resisting against a collar 34 on the rod, holds the arm 30 yieldingly to the nut 32. For connecting the arm 30 that is loose on shaft 21 to the shaft revolubly and at the same time providing for a certain amount of lost motion permitting a play of the parts a collar 35 is keyed on the shaft 21 below the arm 30, and this collar is provided with widely-diverging radial shoulders 36 36, the space between the shoulders being cut away, and the arm 30 is provided with a projecting segmental stop 37 of less segmental sectional extent than the space between the shoulders 36 36 on collar 35 and adapted to enter the recess in the collar 35 to engage in each direction the shoulders 36 thereon when swung from one side to the other thereof. The construction is such that the arbor or shaft 21 on being rotated acts first on the wheel-segments 20, rotating them to some extent and to a corresponding extent bringing the front ends of the levers 18 18 toward each other and moving them rearwardly, and then the collar 35 on the shaft 21 engages the arm 30 and through the rod 29 tilts the levers 24 and 25, bringing their arms and the roller 26 against the outer edges of the levers 18 at their rear ends and forcing the rear ends of the levers 18 toward each other as the front ends are brought farther toward each other by the continued rotation of the shaft 21.

For rotating the shaft 21 a crank-arm 38, loose on the shaft 21, is furcate at its outer ends, and a block 39, provided with lateral trunnions therefor, is pivoted in the arm, and a pin 40, transversely through the block and secured revolubly therein by a transverse holding-pin 41, is provided with a head which is fixed on the end of a rod 42, said rod being pivoted to an eccentric-strap 43, riding on an eccentric 44, loose on a shaft 45. An ancillary crank-arm 46 is keyed on the shaft 21, and the arm 38 is provided with a rigid yoke 47, projecting laterally therefrom and straddling the arm 46, and a screw 48, provided with a handle 49, rotating through the outer end of the yoke, turns into the end of the crank-arm 46, providing a means whereby the length of the rod 42 may be readily adjusted to secure a greater or less bringing together of the lever-arms 18, as desired, by the reciprocating action of the eccentric 44 on and through the rod 42.

A hub 50 on the eccentric 44 is interposed between that eccentric and the cog-wheel 51 loose on shaft 45. The eccentric 44 and the cog-wheel 51 are held to synchronous rotation by means of a dowel-pin 52, inserted in and connecting eccentric bosses, respectively, on the wheel 51 and eccentric 44 rigidly while both are loose on the shaft.

Figure 19:
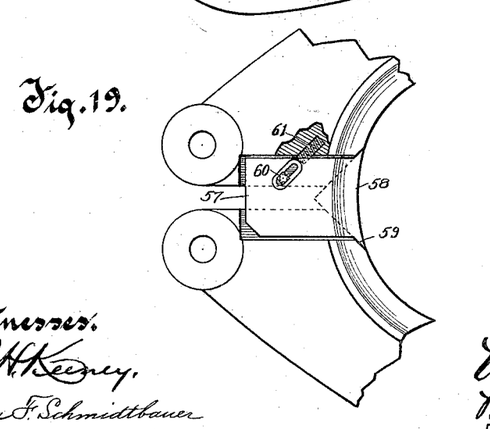
Fig. 19 is an under side view, on an enlarged scale, of a fragment of the front ends of the hame-crease-forming members, a part being broken away to show interior construction.
Figure 20:
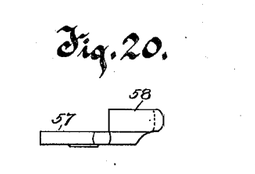
Fig. 20 is an edge view of the joint-closing plate shown in Figs. 18 and 19 in its relation to the hame-crease forming members.

The hame-crease-forming levers 18 are ordinarily constructed of steel or analogous strong but comparatively inexpensive material, and as it is desirable to not bring the steel or iron against the leather of which the collar is made, because of its liability to discolor the leather and also because it is convenient to change the conformation of the inner edges of these levers with reference to shape and size for forming collars of larger or smaller size and of more elongated and narrower or of wider and fore-shortened form I provide removable and interchangeable collar-forming plates 53 53 of some material, advisably of brass, that will not stain or change the color of the leather, which forming-plates have such contour on their inner edges and upper surfaces as adapts them for shaping the specific collar that it is desired to manufacture thereon, and these plates are secured detachably to the levers 18, conveniently by means of bolts 54 54. The forming-plates are adapted to rest chiefly on the upper surfaces of the levers 18 in a recess therefor formed by a flange 55 along the outer edge of these levers and projecting upwardly therefrom. The plates 53 project inwardly beyond the inner edges of the levers 18 and are advisably provided with a rib 56 on their lower surfaces, projecting downwardly therefrom at the inner edges of the levers 18. These forming-plates can be changed at any time for others of the same general form, but varying therefrom in shape in detail, especially with reference to the formation of the inner edges of these plates and their upper surfaces. To break the joint at the front end of these levers, and thus prevent the leather of a collar from getting in between the levers and being pinched and crimped thereby, I provide a joint-closing member consisting of a plate 57, fitting loosely in recesses therefor in the under side of the levers 18 at their front ends, the plate being provided with a bridge 58, consisting of a portion of the plate 57 that extends upwardly therefrom at the inner edge of the plate 57 and having an edge contour substantially like the contour of that end of the crease-forming plates 53 and adapted therewith to form a continuous bearing end adapted to be forced firmly against the collar. The front edge of the bridge 58 is formed with inclined and wedge-shaped edges adapted to fit against complementary inclined edges 59 of the two levers 18 18, so that when the levers are drawn together this bridge-piece will fit snugly between them and its inner edge will complete the rounded contour of the forming-plates 53 in the manner shown in Fig. 19. The plate 57 is secured loosely to one of the levers 18, conveniently by a headed bolt 60 through an elongated slot therefor in the plate and turning into the lever. The plate is held normally in a substantially middle position between the plates yieldingly by a spring 61 in a hole therefor in the plate 18, its outer end bearing against the edge of the plate 57.

To hold the forming-block member 9 up to its work against movement rearwardly by any undue strain thereon, a stop 62 is provided which advisably consists of a piece of iron bent at right angles, one arm of which is provided with a longitudinal slot through which a bolt 63 passes, the bolt being fast in the frame. The other arm of the stop projecting upwardly bears against an elongated boss 64 on the rear side of the forming-block 9. For supporting the upper end of this arm of the stop a brace-rod 65 turns into the frame at its rear end, its front end bearing against the upper end of the upwardly-projecting arm of the stop 62. There is a nut on bolt 63.

Figures 13, 14, 15, 16:
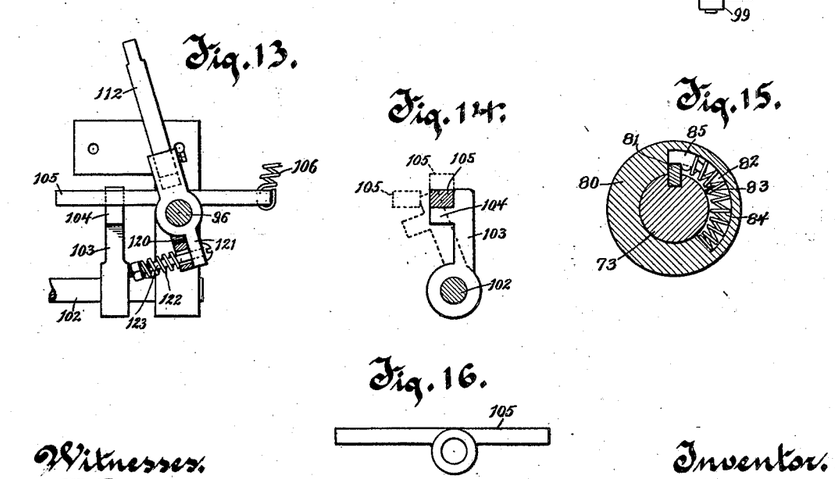
Figs. 13, 14, 15, and 16 show details of a tripping device for putting parts of the machine into and out of operation and related purposes.
Figure 17:
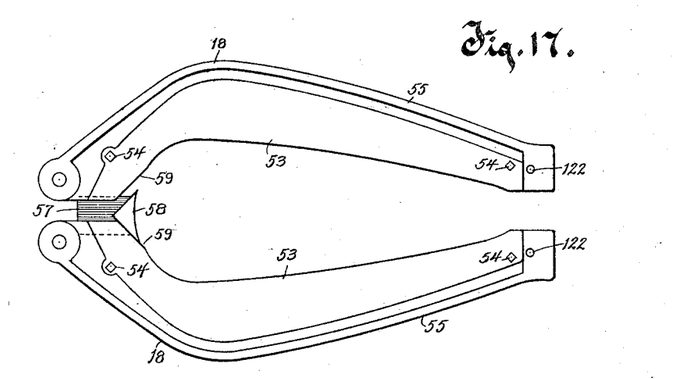
Fig. 17 is a top plan view of the hame-crease-forming members.
Figure 18:
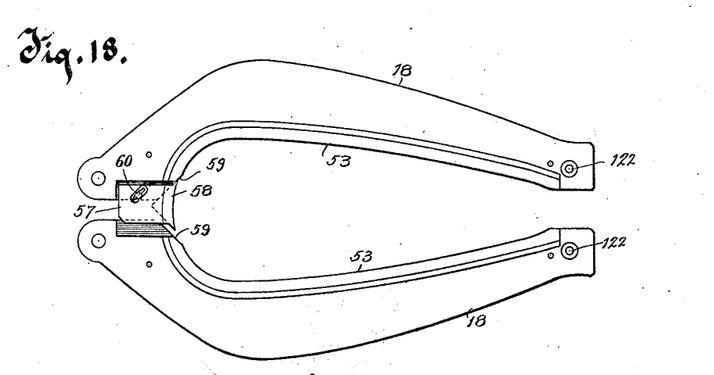
Fig. 18 is an under side view of the same hame-crease-forming members.

When the horse-collar has been placed about the forming-block member 9, it is necessary not only that the hame crease-forming levers 18 be brought tightly to and about the collar in the hame-crease, but that also the roll-forming member 8 be carried up to force against it the roll of the collar and at the same time that the wale-forming member 10 on the block-forming member 9 be brought down onto the collar above to form the wale. For thus raising the roll-forming member 8 and bringing down the wale-forming member 10 mechanism is provided as follows: An eccentric 66, fixed on the shaft 45, is provided with a strap 67, to which an eccentric-rod 68 is affixed, which rod at its front end is branching or furcate, and links 69, pivoted to each of the furcate extremities of the rod 68, extend obliquely upwardly therefrom and are pivoted on the bed-piece 2, and other links 70, also pivoted to the furcate ends of the rod 68, extend obliquely downwardly therefrom and are pivoted to a block or collar 71, secured adjustably on the guide-rod 4 by means of a set-screw 72. The construction is such that a toggle-joint action is secured adapted to force the roll-forming member 8 upwardly against the roll and bring the wale-forming member 9 down on the wale of the collar with constantly-increasing force as the rod 68 is pushed forwardly by the action of the eccentric 66. Curved bearings 111 are formed on the bed-piece 2, which are adapted to receive against them the bearing and thrust of the links 69, either in aid of the pivot connections of the links to the bed or when the pivot connections shall have become worn. A counter-shaft 73, having its bearings in the frame, is provided with a cog-wheel 74, that meshes with the pinion 75, fixed on the driving-shaft 76, mounted in the frame. The counter-shaft 73 is also provided with pinions 77 and 78, revolubly loose on the shaft and meshing, respectively, with the cog-wheel 51 loose and 79 fixed on the shaft 45. A clutch 80, splined and slidable endwise on the counter-shaft 73, is provided with ratchet-teeth at its respective ends, adapted to engage with complementary ratchet-teeth on the pinions 77 and 78. This clutch 80 is mounted on the shaft 73 yieldingly, revolubly, limitedly. For this purpose the key or spline 81, fixed in the shaft 50, projects into a segmental elongated slot 82 in the clutch, whereby the clutch may be rotated from the position shown in Fig. 15 with reference to the spline to a position in which the spline engages the other wall of slot at 83. To hold the clutch yieldingly in the position shown in Fig. 15, a coiled-wire spring 84 is placed in a segmental recess therefor in the clutch and bears at one end against the clutch and at the other end carries a block 85 thereon, which engages the spline 81 and moves therewith when the spring is compressed back to the point at which the spline engages the wall or shoulder 83. The spring 84 is a stiff one, but its capability to yield under heavy pressure prevents a sudden rigid engagement of the teeth on the clutch 80 with the teeth on the pinions 77 or 78, and thereby prevents shock.

To enable the attendant to shift the clutch 80 into or out of engagement with the pinions 77 or 78, a rock-shaft 86 is mounted on the frame and is provided with radial arms 87 87, and blocks 88 88, swiveled in the arms 87, travel in an annular groove therefor in one end of the clutch 80. A lever-handle 89, projecting upwardly from the rock-shaft 86, is provided with a handle 90, and a shiftable latch 91, mounted on this lever-handle, is adapted to engage a catch 92, fixed in the frame either in a notch centrally therein or at one or the other of the ends of the catch. When the latch engages the catch 92 centrally, the clutch 80 is held in a medial position and out of action, and when the lever-handle is shifted to the right or left the clutch can be made to engage with the pinion 77 or 78, and the latch will at the same time be in engagement with the catch 92 at one end or the other thereof.

The driving-shaft 76 is provided with a band-pulley 93, loose on the shaft, and a clutch 94, splined on the shaft, is adapted to be put into engagement with the hub of the band-pulley through a collar 95, also splined on the shaft, by means of a rock-shaft 96, mounted on the frame and provided with a radial furcate arm 97 revolubly loose on the rock-shaft, which arm is pivoted to a ring 98, riding in an annular groove therefor in the collar 95. The rock-shaft 96 has endwise movement in its bearings in the frame, and the arm 97 is held to movement endwise with the rock-shaft by collars 99 99, secured adjustably to the shaft at the respective sides of the arm. The slidable rock-shaft 96 is provided with a coiled-wire expansion-spring 100, interposed between the frame and a collar 101 adjustable on the shaft, by means of which the collar 95 is withdrawn from the clutch 94 to such extent that the clutch is out of engagement with the hub of the band-pulley normally.

Another rock-shaft, 102, mounted in the frame, is provided with a radial arm 103, having a laterally-projecting finger 104 near its outer end, which radial arm and finger are adapted to engage in different positions with a bar 105, mounted transversely on the rock-shaft 96. A contracting-spring 106, anchored to the frame and connected to the bar 105, is adapted to hold the rock-shaft 96 in initial position revolubly. The bar 105, that rests initially on the finger 104 in the manner shown in Figs. 13 and 14, may also when the arm 103 is thrown forward into the position shown in dotted lines in Fig. 14 under certain conditions of the work bears against the outer end of the arm, as indicated in dotted lines in Fig. 14. The rock-shaft 102 is provided with a foot-pedal 107, by which the attendant can rock the shaft. A spring 108, bearing at its outer end against a nut on the bolt 109, fixed in the frame, bears at its inner end against a radial arm 110 on the rock-shaft 102 and is adapted to hold the rock-shaft yieldingly up to initial position.

When a collar in the machine has been clamped by the hame-crease-forming levers 18 and thereafter when the collar has been put under compression by the roll-forming member 8 and the wale-forming member 10, the operative mechanism must be held in position while the collar is assuming permanent shape under the pressure, and to stop the movements of the operative mechanism at the proper time means are provided whereby this is accomplished automatically. In connection with the mechanism for clamping the crease-forming levers 18 about the collar a tripping-arm 112 is mounted adjustably radially on the endwise-movable rock-shaft 96 and two cam-teeth 113 and 114 are fixed on the side of the cog-wheel 51, the cam-teeth being on opposite sides of the wheel. The arm 112 is advisably made in two sections, one telescoping in the other, whereby the arm is made adjustable in length, as well as rotatively and slidably on the rock-shaft. The cam-teeth 113 114 are also advisably mounted adjustably revolubly on the wheel 51, and this is conveniently accomplished by fixing each tooth on a segmental plate 115, which plate is fitted to the wheel and is secured thereto adjustably about the axis of the wheel by bolts 116, fixed in the wheel and projecting through elongated segmental slots therefor, the bolts being provided with nuts that turn against the plates. The cam-teeth 113 114 are so located on the wheel that when they come to the tripping-arm 112 they engage it and throw it over to such extent as to leave the bar 105 momentarily out of engagement with the arm 103 on the rock-shaft 102, whereby the rock-shaft 96 is made free to be moved by the spring 100, thereby releasing the clutch 94 from the running band-pulley 93 and stopping the machine.

Similar devices are employed in connection with the wheel 79, there being an adjustable tripping-arm 117 on the rock-shaft 96, constructed and disposed to engage the cam-teeth 118 119, mounted adjustably on the wheel 79 substantially in the same manner as the cam-teeth 113 114 are mounted on the wheel 51.

As a certain amount of backlash may occur in the wheels 51 and 79, including the eccentrics 44 and 66, respectively, rigid therewith, provision is made for the possible contact of the cam-teeth 113 114 and 118 119 with the tripping-arms 112 and 117 when thus moving backwardly in and by so mounting the tripping-arms 112 and 117 on the slidable rock-shaft 96 that the cam-teeth can pass them when thus moving in a rearward direction. For this purpose the tripping-arms 112 and 117 are mounted revolubly on the shaft 96 between furcate members of clip-stops 120, secured to the shaft 96 adjustably by means of set-screws. The arms 112 and 117 are each provided with a rearwardly-projecting finger 121, that engages in one direction the stops 120 and is held yieldingly thereto in the other direction by a spring 122, interposed between the stop and a nut on a bolt 123, fixed in the finger 121, whereby the tripping-arms are permitted to tilt sufficiently to permit the cam-teeth on the wheels 51 and 79 to pass them when they move rearwardly without affecting the rock-shaft 96.

A spring latch or hook 124, secured to the frame and depending therefrom, is formed and adapted to automatically engage a stud-pin 125, fixed eccentrically in the wheel 51 and to hold the wheel in its initial or home position releasably against any backlash or rearward movement when the mechanism is otherwise at rest in released position. A similar latch 126 is adapted to engage releasably a stud-pin 127, fixed eccentrically in the wheel 79, and similarly hold it against backward movement. A pin 125ª may also be employed to engage hook 124 releasably at the half-revolution. These latches 124 and 126 are advisably made of strips or steel and are each mounted in a block 128, hinged on the frame. The position of each latch can be arranged vertically by means of bolts 129 turning into the block 128 and clamping the latch thereto adjustably. The position of the latch laterally is also adjustable by means of set-screws 130, turning through arms of the block against the frame, one above and the other below the frame, whereby the tension of the spring can be regulated.

When the machine is employed, a collar that is to be shaped thereon is placed about the framing-block member 9, the collar for this purpose being open at the withers end, and thereupon the attendant places his foot on the pedal 107, pressing it down, and thereby through the bar 105 shifts the rock-shaft 96 endwise, putting the clutch 94 into engagement with the running band-pulley 93. The pulley communicates motion to the driving-shaft 76 and thence to the counter-shaft 73. Thereupon the attendant shifts the lever-handle 89, throwing clutch 80 into engagement with the pinion 77, starting the wheel 51 and the eccentric 44, whereby the clamping-levers 18 are moved inwardly to and about the horse-collar, the levers entering the hame-crease in the collar and compressing it in that horizontal plane tightly about the framing-block member 9. In doing this the wheel 51 revolves a half-revolution, thereby moving the clamping-levers to their seat in the crease of the collar, and at the end of this half-revolution of the wheel a cam-tooth on the wheel engages the tripping-lever 112 and rocks the shaft 96 to such extent that it is released from the arm 103 on the rock-shaft 102, and the rock-shaft 96 will then under the action of the spring 100 slide endwise, withdrawing the clutch 94 from the hub of the band-pulley 93, stopping the mechanism. The eccentric 44 and the mechanism connected therewith being at a dead-center remains in this position, holding the arms 18 tightly clamped about the collar. Thereupon the attendant having removed his foot from the pedal 107 again puts his foot on that pedal, forcing it down and starting the counter-shaft 73, and thereupon he shifts the lever-handle 89 in the other direction and puts the clutch 80 into engagement with the pinion 78, and thereby starts the wheel 79 and correspondingly rotates the eccentric 66 a half-revolution, whereby the roll-forming member 8 is elevated and the wale-forming member 10 is brought down, respectively, against the collar below and above, pressing and shaping it on and about the forming-block member 9 and against the interposed and encircling crease-forming clamping-levers 18. When this is accomplished by the half-revolution of the wheel 79 and the eccentric 66, the mechanism will be stopped automatically by the cam-tooth 118 or 119 engaging the tripping-arm 117 on the rock-shaft 96 and tripping it, whereby the rock-shaft is released from the arm 103 on the rock-shaft 102 and is permitted again to slide endwise under the action of the spring 100, releasing the clutch 94 from the band-pulley 93. The eccentric-rod 68 being in the dead-ecenter of the ccentric 66, the roll-forming member and the wale-forming member are locked in place against the collar, in which positions the attendant can leave the machine until the collar under pressure has assumed permanent form. When the collar has assumed permanent form under pressure, it may be released and removed from the machine by reversing the movements used to put it under pressure.

What I claim as my invention is—

1. In a horse-collar-blocking machine, a frame, a forming-block, a pair of elongated hame-crease-forming members pivoted at one end eccentrically on wheel-segments, means for rotating the wheel-segments, levers mounted on the frame adapted to engage the distant ends of the crease-forming members and force them toward each other, and means connecting the means for rotating the wheel-segments operatively with the levers for forcing the distant ends of the crease-forming members toward each other.

2. In a horse-collar-blocking machine, a frame, a pair of elongated crease-forming members, intermeshing wheel-segments axled on the frame and to which the front ends of the crease-forming members are pivoted eccentrically, a crank-arm secured operatively to the shaft or axle of one of the wheel-segments, connected and coöperative levers pivoted on the frame adapted to engage the distant ends of the crease-forming members and force them toward each other, a rod connecting an arm of one of the coöperative levers to the crank-arm on the shaft of the wheel-segment, and means for rotating said wheel-segment shaft.

3. In a horse-collar-blocking machine, a frame, a pair of elongated crease-forming members, wheel-segments meshing with each other and axled on the frame and to which the front ends of the crease-forming members are pivoted eccentrically, a shaft axled in the frame on which one of the wheel-segments is fixed, a crank-arm on the shaft, and means connected to driven parts of the mechanism whereby the shaft and wheel-segments are oscillated and the crease-forming members are operated.

4. In a horse-collar-blocking machine, a frame, a pair of elongated clamping crease-forming members pivoted at one end eccentrically on intermeshing wheel-segments axled on the frame, operatively-connected levers pivoted on the frame adapted to engage and force the distant ends of the crease-forming members toward each other, a crank-arm on the shaft of one of the wheel-segments, a rod connecting the crank-arm and an arm of one of the levers at the distant end of the crease-forming members, another crank-arm on the shaft of the wheel-segments, a rod connected to said last-mentioned crank-arm and to reciprocating mechanism.

5. In a horse-collar-blocking machine, a wheel-segment pivoted on the frame and to which a clamping member is pivoted eccentrically, a crank-arm on the shaft of the wheel-segment, a lever pivoted on the frame and adapted to engage a distant portion of the clamping member, a rod hinged to an arm of the distant lever and extending through a block swiveling in said crank-arm, a nut turning on the rod against the block, and a spring about the rod adapted to hold the block against the nut yieldingly.

6. In a horse-collar-blocking machine, a wheel-segment pivoted on the frame and to which a clamping member is pivoted eccentrically, a crank-arm loose on the shaft of the wheel-segment and provided with a stop-boss, a collar splined on said shaft and provided with radial shoulders adapted to engage the stop-boss on the crank-arm and hold the shaft to oscillation with the crank-arm after lost motion, and means for oscillating the shaft.

7. In combination in a horse-collar-blocking machine, a frame, a clamping member, a wheel-segment to which the clamping member is pivoted eccentrically, the shaft of the wheel-segment, a crank-arm loose on the shaft, an eccentric, an eccentric-strap and its rod connected to the crank-arm loose on the shaft, an ancillary crank-arm fixed on the shaft, and a screw adapted to adjust the relation between the crank-arm loose on the shaft and the ancillary crank-arm fixed on the shaft.

8. In a horse-collar-blocking machine, a frame, a pair of clamping hame-crease, forming members, means adapted to bring together the front ends of said clamping members, means adapted to engage and bring together the rear ends of said clamping members, means connecting the means for bringing together the front ends of the clamping members operatively to the means for bringing together the rear ends of the clamping members so as to cause the two ends of the clamping members to be brought toward each other synchronously, and means for automatcially locking the mechanism for operating the clamping devices releasably.

9. In a horse-collar-blocking machine, the combination with a frame, a revoluble cog-wheel provided with an eccentric stud-pin and an eccentric carrying a strap and its reciprocating rod, of a spring-latch fixed on the frame and adapted to engage the stud-pin and hold the wheel and the eccentric at a dead-center home position releasably.

10. In a horse-collar-blocking machine, the combination with a frame, and a revoluble cog-wheel provided with an eccentric stud-pin and an eccentric carrying a strap and its reciprocating rod, of a spring-latch adapted to engage the stud-pin and hold the wheel and the eccentric at a home position releasably, a block hinged on the frame in which the latch is adjustable endwise, and set-screws adapted to tilt the block and adjust the tension of the spring-latch.

11. In a horse-collar-blocking machine, a pair of elongated crease-forming members at a little distance apart and arranged to be drawn toward each other in shaping a collar, a bridge interposed between adjacent ends of the clamping members, and means supporting the bridge loosely in place and permitting it to assume a position to complete the inner contour of the crease-forming members when they are brought near to each other.

12. In combination, a pair of clamping hame-crease-forming members initially at a little distance apart, means for moving the members toward each other, a plate secured loosely to one member and lapping onto the other member, and a bridge on the plate interposed between the clamping members at their inner edges at the front or large end of the collar, and adapted when the clamping members are moved toward each other to fill the space between the members and make the contour of the inner edge of the clamping members complete and unbroken.

In testimony whereof I affix my signature in presence of two witnesses.

WILLIAM E. PENN.

Witnesses:
LUTE F. ANDERSON,
EUGENE S. FOLSOM.